(12) United States Patent
Skinner

(10) Patent No.: US 6,208,584 B1
(45) Date of Patent: Mar. 27, 2001

(54) PLACE CALIBRATION OF SONAR RECEIVE ARRAY

(75) Inventor: Colin W. Skinner, Castaic, CA (US)

(73) Assignee: L-3 Communications Corporation, Sylmar, CA (US)

( * ) Notice: Subject to any disclaimer, the term of this patent is extended or adjusted under 35 U.S.C. 154(b) by 0 days.

(21) Appl. No.: 09/396,899

(22) Filed: Sep. 16, 1999

(51) Int. Cl.⁷ .................................................. H04R 29/00
(52) U.S. Cl. .................................................................. 367/13
(58) Field of Search ................................. 367/13, 154, 20; 73/1 DV

(56) References Cited

U.S. PATENT DOCUMENTS

| | | | |
|---|---|---|---|
| 3,859,620 | * | 1/1975 | Percy ........................................ 367/13 |
| 3,864,664 | * | 2/1975 | Trott et al. ................................ 367/13 |
| 4,205,394 | * | 5/1980 | Pickens ..................................... 367/13 |
| 4,267,585 | | 5/1981 | Georgallis ................................ 367/13 |
| 4,290,123 | | 9/1981 | Pickens ..................................... 367/13 |
| 4,453,328 | * | 6/1984 | Van Buren ............................... 367/13 |
| 5,552,791 | * | 9/1996 | Metal ....................................... 342/174 |
| 5,654,937 | * | 8/1997 | Striffler ..................................... 367/13 |

* cited by examiner

Primary Examiner—Ian J. Lobo
(74) Attorney, Agent, or Firm—Roberts & Mercanti, LLP

(57) ABSTRACT

The invention pertains to sonar receive arrays. More particularly, the invention pertains to a process for calibrating the amplitude, position and phase angle of an array of underwater receive hydrophones with respect to one another. The process requires projecting an acoustic test signal at a known frequency from a towed underwater acoustic projector toward an array of towed, underwater, interconnected, receive hydrophones; detecting and determining the response of the receive hydrophones to said test signal by signal processing means; and calibrating at least one parameter for the operation of the receive hydrophones resulting from the response. Calibrated parameters include the amplitude, position and phase angle of the receive hydrophones relative to one another.

21 Claims, 3 Drawing Sheets

PLACE CALIBRATION OF SONAR RECEIVE ARRAY

BACKGROUND OF THE INVENTION

1. Field of the Invention

The invention pertains to sonar receive arrays. More particularly, the invention pertains to a process for calibrating the amplitude, position and phase angle of signals received from an array of underwater hydrophones with respect to one another. The array is linear and the hydrophones are distributed along the length thereof. Still more particularly, the invention pertains to the in situ measurement and calibration of various parameters which must be determined in order to calibrate and improve the performance of a towed array of receive hydrophones while the array is being towed through an underwater environment. The system operates by monitoring the responses of discrete hydrophones to generated acoustic test signals from a towed, stationary projector source.

2. Description of the Related Art

The gathering of data in an acoustic environment by means of an array of electrically interconnected hydrophones is important for commercial and military purposes. It is well known in the field of sonar systems to pull a submersible towed body behind a water craft. The towed body has one or more acoustic projectors associated with it. The towed body in turn draws behind it one or more flexible towed arrays of waterborne, signal receiving, hydrophone sensors. Such sensors are useful for detecting the position of underwater sonar target contacts.

Towed arrays of hydrophones are well known in the art. Such are long, continuous, neutrally buoyant hose lines, often several hundred meters long, which periodically contain numerous hydrophone receivers. Typically, these elongate arrays have a number of hydrophone elements in modules, along with their associated electronics and control leads, contained within the hose-shaped structure that extends through the water. In order to gather data in an ocean environment, one end of a linear hydrophone array is coupled to a navigating vessel, via the intermediate towed body. The individual hydrophones cooperate or interact to provide a beam, which may be steered to determine the bearing from the array of various acoustic targets. The hydrophones are connected to suitable electronics on the towing vessel which indicates the bearing of an identified underwater target. Exemplary towed arrays are described in U.S. Pat. Nos. 4,554,650 and 5,412,621. In locating submerged bodies, sonar is either used passively, through reception of signals sent through water, or actively wherein a pulse of sound is sent into the water by a sonar projector. The sound is then reflected back from the target and detected by the hydrophone arrays as an echo. This echo is received as mechanical energy by an acoustic transducer, converted into electrical energy, and read by a computer on the vessel to pinpoint the location of objects within the water. As shown in U.S. Pat. No. 5,844,860, elongated, hose-like towed arrays of hydrophones attached to the rear end of towed bodies are commonly used for the acoustic sensing of moving objects within the ocean.

Over a period of time, the detection capabilities of individual hydrophones in towed array may unpredictably vary. Consequently, to accurately interpret information provided by the array, calibration must be performed. In the prior art, various techniques are available for calibrating sections of a hydrophone array. In one approach to calibrating an acoustic array, the responses of individual hydrophones may be monitored, hydrophone by hydrophone, to determine their respective sensitivities to a test signal. However, due to the very large number of discrete hydrophones in an array, which may have a very long length, such calibration technique is extremely tedious. In addition, such calibration would have to be performed at a shore installation, so that changes in hydrophone characteristics occurring after deployment of the array at sea would not be possible. In another calibration approach, the sensitivity of individual hydrophones of an array are indirectly determined, while the array is deployed, by monitoring an acoustic source which is not located at or focused on any individual hydrophone. In this approach, multipath effects interfere with sensitivity measurements. In order to employ a towed array to determine the bearing of an acoustic source, it is necessary to know the positions of the respective hydrophones of the array in relation to one another. For such calibration, a calibration or test signal of selected frequency is projected to the array so that it is received simultaneously by every hydrophone of the array section. In cases where multiple hydrophones input an acoustic channel, the gross or collective response of the hydrophones to test signal includes the individual responses of defective hydrophones.

It is common practice in the art to assume that all of the hydrophones lie on the same line, at known distances along the array. However, such assumption is often invalid, such as when the towing vessel is unable to maintain a straight track through the ocean, or when a portion of the array sinks to a lower depth than another portion thereof. If the above assumption becomes inaccurate, the beamforming capability suffers and target bearing detection by means of the array may become unacceptably inaccurate. It would be desirable to directly calibrate individual hydrophones of a towed array during array deployment. U.S. Pat. No. 4,205,394, discloses one transportable calibration technique. U.S. Pat. No. 4,290,123 discloses an apparatus for determining the value of parameters of an interconnected array of acoustic sensor elements which includes a cart for successively bringing a projector into a closely spaced relationship with each of the sensor elements included in a length of the array. U.S. Pat. No. 4,267,585 discloses a device for determining the configuration of elongated, underwater arrays as they are drawn through the water, which comprises a collar adapted to fit around a portion of the array having sufficient hydrodynamic drag to remain substantially stationary in the water relative to the linear movement of the array as it is drawn through the collar. The use of such additional structures is disadvantageous.

Accordingly the invention provides a system which permits the inexpensive, expeditious and accurate determination of the characteristic underwater configuration of a towed acoustic array and which permits calibration and performance tests on each hydrophone in such underwater towed arrays.

This invention provides an improved system by which the detection capabilities of respective hydrophones lying along a towed array may be calibrated while the array is deployed in acoustic data gathering operations in deep water by calibrating each of the amplitude, position and phase angle of data received from the hydrophones relative to one another. The system uses an already in place projector of an active sonar system and hence does not require additional equipment.

SUMMARY OF THE INVENTION

The invention provides a process for calibrating an array of underwater receive hydrophones which comprises:

(a) projecting an acoustic test signal at a known frequency from a towed underwater acoustic projector toward an array of towed, underwater, interconnected, receive hydrophones;

(b) detecting and determining the response of the receive hydrophones to said test signal by signal processing means;

(c) calibrating at least one parameter for the operation of the receive hydrophones resulting from the response.

The invention also provides a system for calibrating an array of underwater receive hydrophones which comprises:

(a) means for projecting an acoustic test signal at a known frequency from a towed underwater acoustic projector toward an array of towed, underwater, interconnected, receive hydrophones;

(b) signal processing means for detecting and determining the response of the receive hydrophones to said test signal;

(c) means for calibrating at least one parameter for the operation of the receive hydrophones resulting from the response.

DETAILED DESCRIPTION OF THE PREFERRED EMBODIMENT

Figure 1:
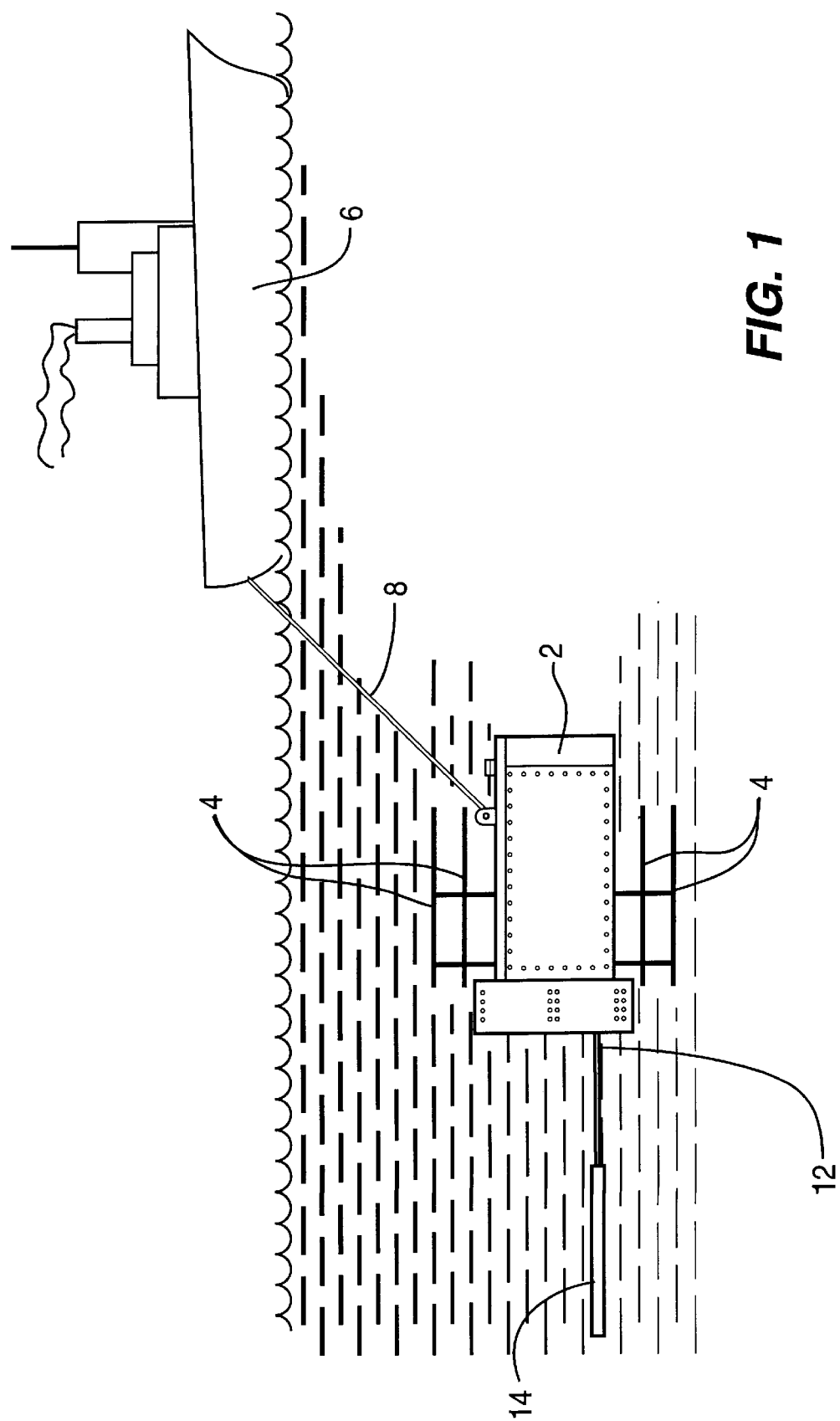
FIG. 1 is a schematic, side view of a towed body arrangement.

Referring to FIG. 1, there is shown a towed body arrangement according to the invention. The arrangement comprises a submersible towed body 2 which is submersible to a controllable depth and is deployed behind a towing vessel 6 via a towing cable or umbilical 8 that physically and electrically connects suitable electronics on the vessel 6 to the towed body 2. Within or extending from the towed body 2 are one or more sonar projectors 4 which project acoustic signals of a known frequency and amplitude. Towed body 2 draws one or more towed arrays of hydrophones 14 optionally via a umbilical cable 12 which both draws the arrays and electrically connects the arrays to suitable electronics on the vessel 6. Preferably the sonar projector is located on the body 2, or it may be on the towing vessel 6. However, an important feature of the invention is that the projectors are at a fixed position with respect to one end of the array. Preferably the towed arrays 14 comprises neutrally buoyant, flexible, hose walled devices which align with the flow of water. Such arrays 14 have long been used for the sensing of acoustic pressures and their configurations are many and varied to provide a desired sensing and frequency response.

Figure 2:
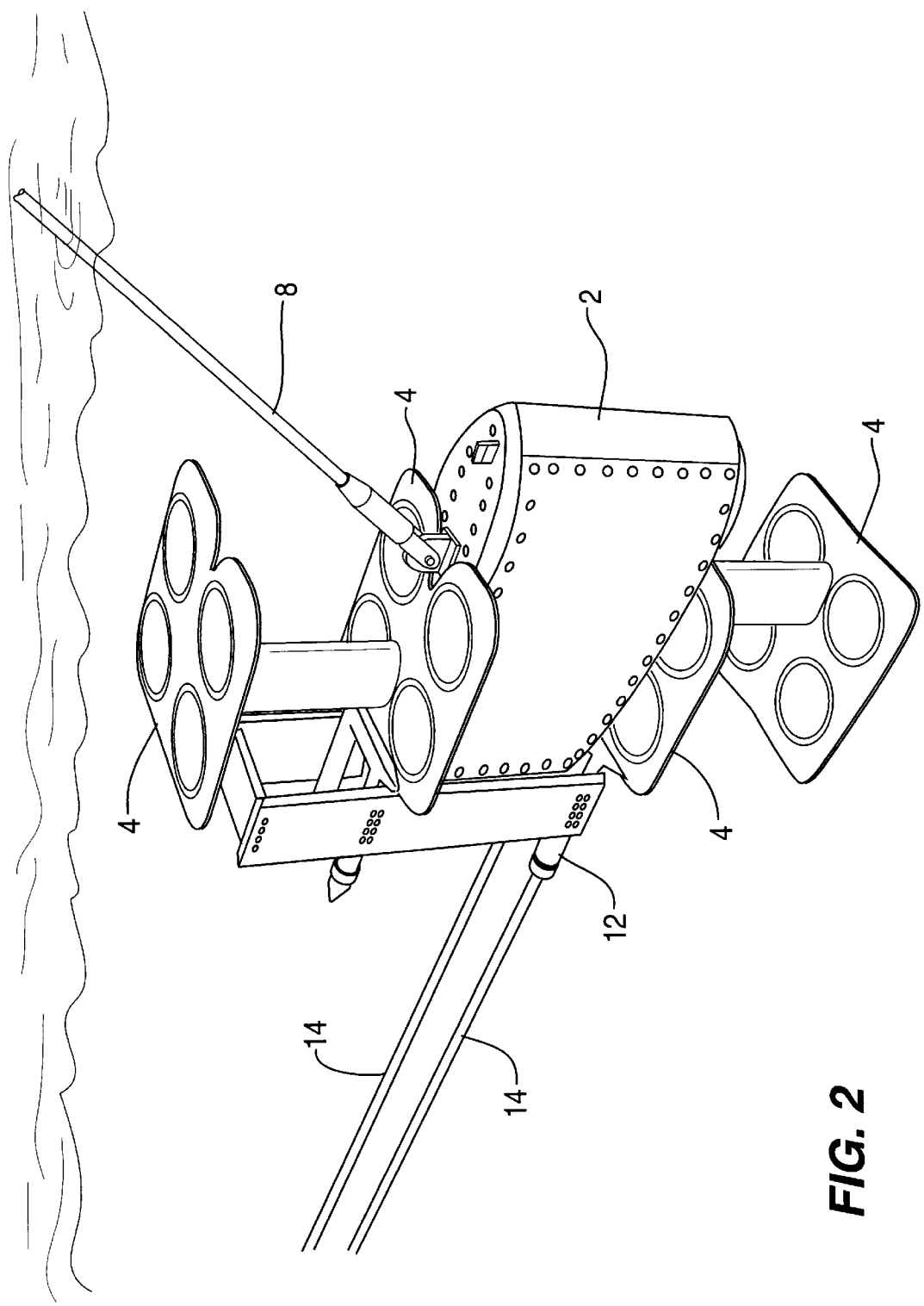
FIG. 2 shows a perspective view of a towed body bearing projectors and towing arrays of hydrophones.

The projector is usually employed to send out acoustic waves that reflect off a target in the sea, and return echoes are received by towed arrays 14. The array of hydrophones typically comprises a plurality hydrophones equally spaced along a towed array, which is essentially a long oil filled tube having dispersed at regular intervals along its length a series of hydrophones which detect the presence and location of underwater objects by receiving acoustic sound waves and communicating a signal back to the vessel which is towing the array. Sensing information received by the hydrophones is relayed to suitable electronics on the towing vessel via cable 8. Suitable beamforming apparatus receives bearing and positioning information from the hydrophones after which they are converted into electrical signals and transmitted to a computer on the towing vessel 6. FIG. 2 shows a perspective view of a towed body 2 bearing projectors 4 and towing arrays of 14 of hydrophones. The hydrophones themselves, the towed arrays and the projectors are well known in the art. It is to be noted that other configurations of projectors could be employed to project signals to hydrophones of the array.

Such arrays, however, which may extend for well over a thousand feet in length, characteristically do not assume a linear configuration when towed by a vessel, but rather extend in such a way that the depth and horizontal displacement along the towed array vary considerably. In one preferred embodiment, the two arrays, each having 48 hydrophones spaced roughly 21 inches apart are employed. The outputs of all 96 hydrophones are combined and used to detect and localize target echoes. In use, the hydrophones indicate data pertaining to an amplitude, position and phase angle information derived from an acoustic wave received when an incident wave from the projector is reflected back from an underwater target. In order to assure an accurate interpretation of any signal received from hydrophones along the array indicating the presence of an underwater object, it is necessary to calibrate such towed arrays so that the acoustic signal level is known and the characteristic underwater configuration of each towed array is known and taken into consideration in determining the position and characteristics of the underwater object being detected. In order to extract target bearing from the combined signals it is important to know sensor location, sensor amplitude output for a known input pressure, and the phase angle of the output signal relative to the input pressure. According to the invention, the projectors on the towbody are used to produce an acoustic calibration tone and subsequently monitor each hydrophones output. The calibration signal propagates at a known speed down the length of the receive arrays and, thus, can be used to determine the hydrophone location. The calibration signal decreases in amplitude as it propagates down the length of the array, but it follows a theoretical spherical spreading loss curve so the amplitude is known at each sensor location. This allows in-place calibration and real time updating of the necessary information so the system can accurately compute bearing angle of the target. When the amplitude, position and phase angle information from each hydrophone is integrated by suitable electronics onboard the towing vessel, the bearing of the target can be determined. Therefore, in order to determine the bearing of a target, it is necessary to know the positions of the respective hydrophones of the array with respect to one another. According to the invention, a known calibration or test signal of a selected frequency is projected to the array so that the test signal is received by every hydrophone of the array.

By calibrating the amplitude, position and phase angle data from the receive hydrophones relative to one another, a mathematical error correction factor can be calculated for each hydrophone. This error correction factor can then be applied to subsequent reflected target data to provide adjusted target bearing data.

In one preferred embodiment of the invention the calibration emits continuous acoustic signals which are encoded with the signals representing the vertical and horizontal displacement of the array and these multiplexed signals are sent from each hydrophone in the array to the vessel. The composite acoustic signals are received by each hydrophone and converted to electrical signals which are transmitted along the array to the towing vessel which processes the electrical signals. It will be appreciated that the long towed array does not assume a straight line configuration in water but rather assumes a configuration which varies in both the vertical and horizontal direction at different points. When the signals have been received from each hydrophone its respective vertical and horizontal position permit an accurate determination of the characteristic profile of the array as it is towed through the water.

The calibrating process involves deploying the hydrophone array in an underwater environment from which acoustic data is to be gathered; projecting an acoustic test signal at a known frequency from a towed underwater acoustic projector toward the array of hydrophones; detecting and determining the response of the hydrophones to the test signal by signal processing; and calibrating the amplitude, position and phase angle data from the receive hydrophones relative to one another by determining and applying a mathematical error correction factor for each hydrophone. In order calibrate, or determine the actual acoustic sensitivity of each hydrophone, a projector 4 projects a test signal having a known frequency. The responses of respective hydrophones to such test signal are coupled to a monitoring device and determined by means of conventional signal processing techniques. These acoustic signals in which the data are encoded, show the position of the hydrophones in the water and converted to the electrical signals to a suitable receiver. It will, of course, be appreciated that the actual instrumentation required to accomplish this communication of signals is accomplished using conventional equipment.

The calibration is done by using the projector and by knowing the distance from each projector stave to each hydrophone, the speed of sound in water and the transmitted frequency in the water.

Calibration Method:

Assuming the average velocity in the water is corrected as derived from averaging all velocities derived from transmitting and receiving the signal on successive hydrophones using hydrophone #2 as reference (ignoring hydrophone 1) then use the equation (1)

$$\phi = \frac{2\pi \cdot D_n \cdot f}{C} \text{ to determine } C \tag{1}$$

$$C = \frac{\sum_{3}^{48} \frac{(2\pi \cdot D_n \cdot f)}{\phi_n}}{46}$$

where

C=average velocity of sound for the array
n=hydrophone number
$D_n$=hydrophone separation between reference hydrophone #2 and hydrophone #n
f=transmitted frequency
$\phi_n$=phase angle between hydrophone #2 and hydrophone #n Using this average velocity, determine $\Delta\phi$ for each hydrophone with reference to hydrophone 2 for two frequencies, for example 1200 Hz and 1600 Hz. Use the $\Delta\phi$ to calculate $\Delta D$ using the above equation. Apply this to the hydrophone at frequency F1 and calculate the offsetting phase for each hydrophone. These two corrections are for absolute offset and error in the position of the hydrophone with respect to its theoretical or ideal position. The next step is to measure the amplitude of all hydrophones and adjust all to the 20 log R line where R is the separation between hydrophones. This should be performed, in one preferred embodiment, at a mid frequency of 1400 Hz.

Figure 3:
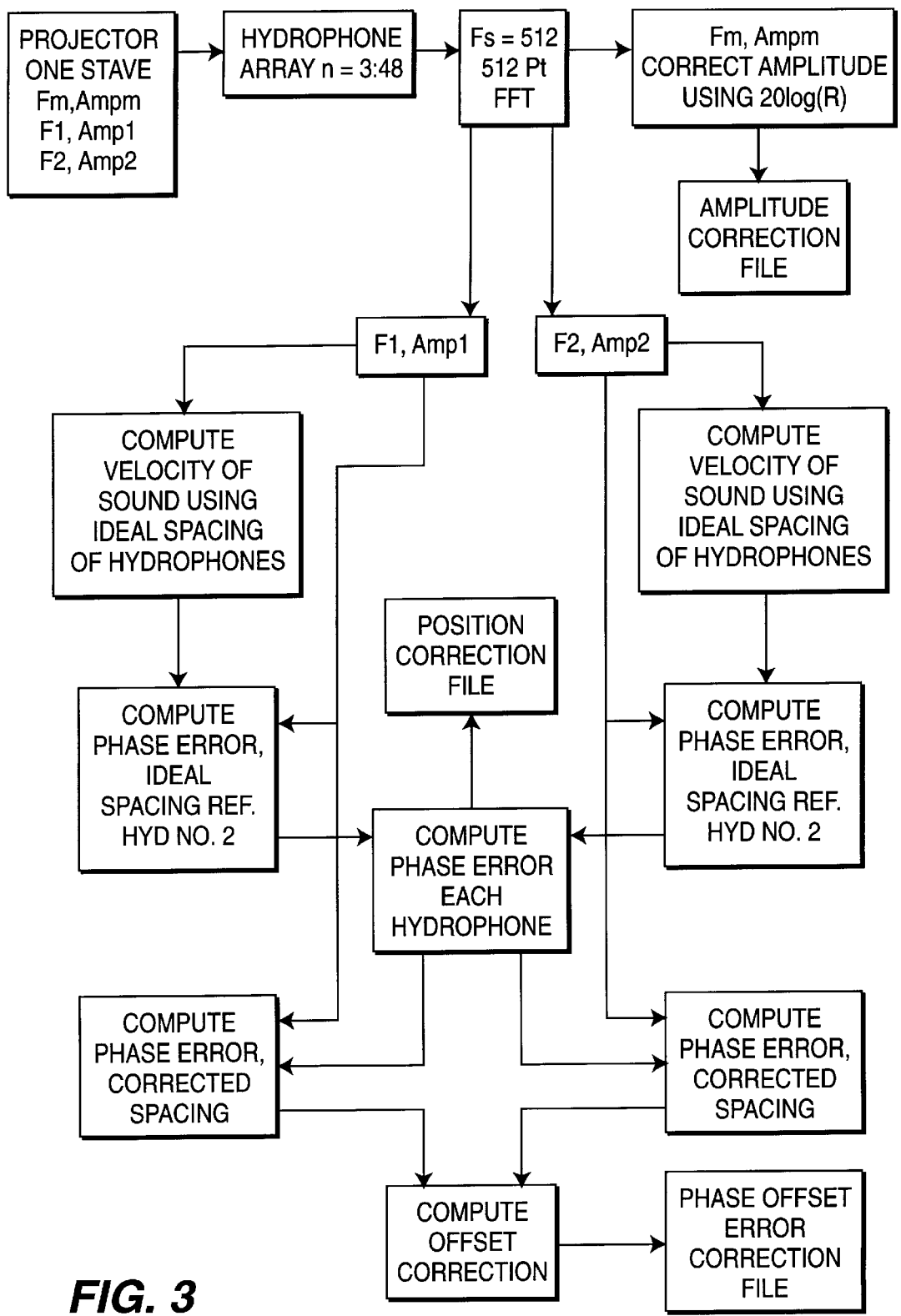
FIG. 3 shows a flow process diagram of the calibration process.

FIG. 3 shows a flow process diagram of the calibration process. Using one stave of an acoustic projector, transmit a rectangular wave at each of three frequencies, namely the endpoints F1 and F2, and midpoint Fm of the desired range. In the preferred embodiment, F1 is set at 1200 Hz, Fm is set at 1400 Hz and F2 is set at 1600 Hz. The wave amplitude should be the same for each frequency. The amplitude of each frequency should be from about −10 dB to about −40 dB below the saturation of the nearest hydrophone. In the preferred embodiment, the amplitude of each of F1, F2 and Fm is −40 dB with reference to full power for the system. Apply these signals to each of the hydrophones of the linear array. In the preferred embodiment, each array has 48 hydrophones numbered n=1 through n=48. Next one takes a series of sample amplitude data readings at each hydrophone. In the preferred embodiment, the number of samples Fs is 512 samples, the number required for a Fast Fourier Transform on data received from each hydrophone. It is assumed that as the distance from the projector doubles, the amplitude of the acoustic energy decreases to one-half Therefore one may assume that the amplitude of the signal should follow a −20 log(R) loss curve for each hydrophones in the array. Determine the hydrophone amplitude −20 log(R) curve for each hydrophone in the arrays. Find the mean variation and then determine the mean variation amplitude for each hydrophone. This is the amplitude correction (dB) to add to each hydrophone.

Using each of F1 at Amp 1 and F2 at Amp 2, compute the velocity of sound using the ideal spacing of the hydrophones. Compute the phase error for the ideal spacing for hydrophones 2–48 using equation (1). Compute the position error for each hydrophone. This is the position correction to add to each hydrophone.

Using each of F1 at Amp 1 and F2 at Amp 2 as well as the position error for each hydrophone compute the average phase error of each hydrophone, using the position corrected spacing between hydrophones with reference to the first hydrophone. Compute the phase offset correction from the theoretical phase. This is the phase offset correction to add to each hydrophone.

The following nonlimiting example serves to illustrate the invention:

EXAMPLE

The tow body having acoustic projector and two receive arrays of 48 hydrophones each shown in FIG. 2 is deployed from a ship proceeding at a speed of 4 to 8 knots at an ocean location having a minimum depth of 600 meters. The cable scope is 300 meters to minimize reflections and ship noise. Transmit on one forward projector stave only. Transmission is at a level 3 dB below saturation measured at hydrophone No. 48 and No. 96, i.e. the closest hydrophones. All hydrophone data is decimated. The sample rate in this example is 512 samples per second.

Physical conditions of the projector and the arrays:

Forward Projector to first hydrophone distance is 7.85 ft.=8.35 dB spreading loss. Acoustic center of all projectors to forward hydrophone=7.49 ft.=7.9576 dB spreading loss.

Forward Projector to Aft Hydrophone distance=74.85 ft.=27.94 dB spreading loss. Total spreading loss from array end-to-end is 19.59 dB.

Distance to hydrophone No. 24 (mid array)=42.054 ft=22.93 dB. Spreading loss to Hydrophone No. 24 is 14.97 dB.

Amplitude Calibration:

Transmit with the following conditions
Frequency: Fm=1400 Hz

Wave Shape: Rectangular

Duration: 1 Second

Amplitude: Ampm=−40 dB

Acquire data from 10 each one second pulses

Perform 10 each 512-pt Fast Fourier Transforms on data received from each hydrophone of both arrays. Assume 20 log R loss for the amplitude of the hydrophones in each array. Determine the hydrophone amplitude −20 log R curve for each hydrophone in both arrays. Find the mean variation. Determine the mean variation amplitude for each hydrophone. This is the amplitude correction (dB) to add to the hydrophone.

Frequency F1 Data:

Transmit with the following conditions

Frequency: F1=1200 Hz

Wave Shape: Rectangular

Duration: 1 Second

Amplitude: Amp1=−40 dB

Acquire data from 10 each one second pulses

Perform 10 each 512-pt Fast Fourier Transforms on data received from each hydrophone of both arrays. Assume ideal spacing of the hydrophones. Calculate the speed of sound for each pair of hydrophones from No. 3 to No 48 using hydrophone No. 2 as reference.

Take the mean velocity and use for speed of sound in subsequent calculations with this set of data. The temperature of the water may change as the tow body moves through the water so this is performed for each set of data. Determine the average phase error of each hydrophone in both arrays, using No. 2 and No. 50 for reference, from the theoretical phase. Save the mean 1200 Hz phase data. The phase between No. 2 and No. 50 should be zero. The correction factor between the two is applied to all hydrophones of the second array.

Frequency F2 Data:

Transmit on Stave A with the following conditions

Frequency: F2=1600 Hz

Wave Shape: Rectangular

Duration: 1 Second

Amplitude: Amp 2=−40 dB

Acquire data from 10 each one second pulses

Perform 10 each 256-pt Fast Fourier Transforms on data received from each hydrophone of both arrays. Calculate the speed of sound for each pair of hydrophones from No. 3 to No 48, using hydrophone No. 2 as reference. Take the mean velocity and use for speed of sound in subsequent calculations for this set of data. Determine the average phase error of each hydrophone in both arrays using No. 2 and No. 50 for reference from the theoretical phase. Save the mean 1600 phase data. Determine the Phase difference at F2 and F2 for each pair of hydrophones and use the data to calculate the displacement error of the hydrophone using the following:

$DE=(C)PHE/(2\pi F)$

DE: displacement error

C: sound velocity in water

PHE: phase difference F1 & F2

F: F2-F1

Apply the position error to the hydrophone positions of each array and calculate the phase of each pair of hydrophones at F1 and F2. This value minus the average of the phase at 1200 Hz and 1600 Hz is the phase offset for each hydrophone.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A process for calibrating an array of underwater receive hydrophones which comprises:
    (a) projecting an acoustic test signal at a known frequency from a towed underwater acoustic projector simultaneously towards a plurality of towed, underwater, interconnected, receive hydrophones arranged in an array, which projector is at a fixed position with respect to one end of the array;
    (b) detecting and determining the response of the plurality of receive hydrophones to said test signal by signal processing means;
    (c) calibrating at least one parameter for the operation of the plurality of receive hydrophones resulting from the response.

2. The process of claim 1 wherein step (c) comprises calibrating at least one of the amplitude, position and phase angle of the receive hydrophones relative to one another.

3. The process of claim 1 wherein step (c) comprises the amplitude of the receive hydrophones relative to one another.

4. The process of claim 1 wherein step (c) comprises calibrating the position of the receive hydrophones relative to one another.

5. The process of claim 1 wherein step (c) comprises calibrating the phase angle of the receive hydrophones relative to one another.

6. The process of claim 1 wherein step (c) comprises calibrating each of the amplitude, position and phase angle of the receive hydrophones relative to one another.

7. The process of claim 1 wherein step (c) comprises first calibrating each of the position and amplitude of the receive hydrophones relative to one another and then calibrating the phase angle of the receive hydrophones relative to one another.

8. The process of claim 1 wherein the acoustic projector is attached to a body which is towed by a vessel and the receive hydrophones are arranged in a linear array attached to and towed by the towed body.

9. The process of claim 1 wherein the acoustic projector is attached to a body which is towed by a vessel and the receive hydrophones are arranged in a pair of linear arrays attached to and towed by the towed body.

10. The process of claim 1 wherein the acoustic test signal has a frequency in the range of from about 1200 Hz to about 1600 Hz.

11. The process of claim 1 wherein the acoustic test signal comprises a rectangular envelope having a frequency in the range of from about 1200 Hz to about 1600 Hz.

12. The process of claim 1 which comprises detecting and determining the response of a first receive hydrophone to said test signal by signal processing means; detecting and determining the response of other receive hydrophones to said test signal by signal processing means; calibrating at least one parameter for the operation of the other receive hydrophones relative to the response of the first receive hydrophone.

13. The process of claim 12 wherein the acoustic test signal has a frequency in the range of from about 1200 Hz to about 1600 Hz.

14. The process of claim 12 which comprises detecting and determining the response of a first receive hydrophone to at least two test signals at different frequencies by signal processing means; detecting and determining the response of a the other receive hydrophones to the least two test signals at different frequencies by signal processing means; calibrating at least one parameter for the operation of the other receive hydrophones relative to the response of the first receive hydrophone at the least two test signals at different frequencies.

15. The process of claim 14 wherein the acoustic test signals have a frequency in the range of from about 1200 Hz to about 1600 Hz.

16. The process of claim 1 wherein the array of receive hydrophones are towed underwater at a depth of about 600 meters or more.

17. A system for calibrating an array of underwater receive hydrophones which comprises:

(a) means for projecting an acoustic test signal at a known frequency from a towed underwater acoustic projector simultaneously towards a plurality of towed, underwater, interconnected, receive hydrophones arranged in an array which projector is at a fixed position with respect to one end of the array;

(b) signal processing means for detecting and determining the response of the plurality of receive hydrophones to said test signal;

(c) means for calibrating, at least one parameter for the operation of the plurality of receive hydrophones resulting from the response.

18. The system of claim 17 wherein (c) comprises means for calibrating at least one of the amplitude, position and phase angle of the receive hydrophones relative to one another.

19. The system of claim 17 wherein the acoustic projector is attached to a body which is attached to a vessel and the receive hydrophones are arranged in at least one linear array attached to the towed body.

20. The system of claim 17 wherein the acoustic projector is attached to a body which is attached to a vessel and the receive hydrophones are arranged in a pair of linear arrays attached to the towed body.

21. The system of claim 17 wherein the acoustic projector comprises means for projecting an acoustic test signal having a frequency in the range of from about 1200 Hz to about 1600 Hz.

* * * * *